(12) United States Patent
Egawa et al.

(10) Patent No.: US 10,025,168 B2
(45) Date of Patent: Jul. 17, 2018

(54) PROJECTOR CAPABLE OF REDUCING SPECKLE NOISE

(71) Applicant: SEIKO EPSON CORPORATION, Tokyo (JP)

(72) Inventors: Akira Egawa, Shiojiri (JP); Junichi Okamoto, Fujimi-Machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 174 days.

(21) Appl. No.: 14/916,937

(22) PCT Filed: Sep. 22, 2014

(86) PCT No.: PCT/JP2014/004855
§ 371 (c)(1),
(2) Date: Mar. 4, 2016

(87) PCT Pub. No.: WO2015/045358
PCT Pub. Date: Apr. 2, 2015

(65) Prior Publication Data
US 2016/0223887 A1    Aug. 4, 2016

(30) Foreign Application Priority Data

Sep. 24, 2013  (JP) ................................. 2013-197351

(51) Int. Cl.
*G03B 21/20*   (2006.01)
*G03B 21/14*   (2006.01)
(Continued)

(52) U.S. Cl.
CPC .......... *G03B 21/142* (2013.01); *G02B 27/48* (2013.01); *G03B 21/208* (2013.01);
(Continued)

(58) Field of Classification Search
CPC ........ G02B 27/48; G03B 21/14; G03B 21/20; G03B 21/08; G03B 21/00; H04N 9/31; H04N 5/74
See application file for complete search history.

(56) References Cited

U.S. PATENT DOCUMENTS

| 2010/0171927 A1 | 7/2010 | Kitano et al. |
| 2012/0086917 A1 | 4/2012 | Okuda et al. |

(Continued)

FOREIGN PATENT DOCUMENTS

| CN | 102472955 A | 5/2012 |
| CN | 102483565 A | 5/2012 |

(Continued)

OTHER PUBLICATIONS

Kubota, Shigeo "Research Report on Ubiquitous Laser Display," The Japan Machinery Federation Optoelectronics Industry and Technology Development Association, pp. 136-141, 2009.

(Continued)

*Primary Examiner* — Sultan Chowdhury
*Assistant Examiner* — Danell L Owens
(74) *Attorney, Agent, or Firm* — Oliff PLC

(57) ABSTRACT

A projector capable of reliably reducing speckle noise includes a light modulation element which modulates laser light, and a projection optical system on which light emitted from the light modulation element is incident. When the center coordinates of an illumination distribution of laser light in an exit pupil of the projection optical system are $x=0$ and $y=0$, normalized illumination at each coordinate is $P(x,y)$, and a calculation range of integration is $r$ (mm), the value of EP determined from a specific numerical expression is set in a range according to the color of laser light.

22 Claims, 8 Drawing Sheets

(51) Int. Cl.
    *G02B 27/48*    (2006.01)
    *H04N 9/31*     (2006.01)
(52) U.S. Cl.
    CPC ....... *G03B 21/2033* (2013.01); *H04N 9/3105* (2013.01); *H04N 9/3152* (2013.01); *H04N 9/3161* (2013.01)

(56) References Cited

U.S. PATENT DOCUMENTS

| | | | |
|---|---|---|---|
| 2012/0147334 A1 | 6/2012 | Mizushima et al. | |
| 2012/0182529 A1 | 7/2012 | Otani | |

FOREIGN PATENT DOCUMENTS

| | | | |
|---|---|---|---|
| CN | 102591109 A | 7/2012 | |
| EP | 0985952 A1 | 3/2000 | |
| EP | 2587309 A1 | 5/2013 | |
| JP | 2000-206449 A | 7/2000 | |
| JP | 2009-216843 A | 9/2009 | |
| JP | 2010-197916 A | 9/2010 | |
| JP | 2011-180281 A | 9/2011 | |
| JP | 2012-159823 A | 8/2012 | |
| JP | 2013-101173 A | 5/2013 | |
| KR | 2012-0080769 A | 7/2012 | |
| TW | 201213858 A | 4/2012 | |
| WO | 99-49358 A1 | 9/1999 | |
| WO | 2010/023444 A1 | 3/2010 | |
| WO | 2010-029817 A1 | 3/2010 | |
| WO | 2011/040479 A1 | 4/2011 | |
| WO | 2011/161931 A1 | 12/2011 | |

OTHER PUBLICATIONS

Jan. 6, 2015 Search Report issued in International Patent Application No. PCT/JP2014/004855.
May 9, 2017 Extended European Search Report issued in Patent Application No. 14849917.1.

PROJECTOR CAPABLE OF REDUCING SPECKLE NOISE

BACKGROUND

1. Technical Field

The present invention relates to a projector.

2. Related Art

A projector using a laser light source has advantages, such as reduction in the size of the device, excellent color reproducibility, instantaneous lighting, and long life time of the light source. In general, laser light emitted from the laser light source is coherent light. For this reason, in this type of projector, a spot pattern, called speckle noise, caused by interference of laser light may be visually recognized on a screen. Accordingly, display quality is significantly degraded.

In the projector of the related art using the laser light source, a countermeasure for suppressing degradation of display quality due to speckle noise is used. JP-A-2009-216843 (Document 1) discloses a projection display device in which an entrance pupil image of a projection lens is greater than an exit pupil diameter of an illumination optical system, and which includes pupil matching means for rotationally moving the exit pupil image of the illumination optical system in the entrance pupil of the projection lens. "Research Study Report on Ubiquitous Laser Display in 2009" by Kazuo Kuroda and 17 others, The Japan Machinery Federation, Optoelectronics Industry and Technology Development Association, March 2010 (Document 2) describes an explanation relating to a speckle phenomenon, a speckle elimination method, and the like.

In the projection display device of Document 1, as the pupil matching means, a transparent plate which has a plurality of minute wedge-shaped portions and a motor which rotates the transparent plate are provided. Since the pupil matching means rotationally moves the exit pupil image of the illumination optical system, it is necessary to increase the size of an imaging lens or a projection lens disposed at a subsequent stage of the pupil matching means. As a result, according to the projection display device, there is a problem in that the device increases in size due to a need for a space where the pupil matching means is disposed and an increase in the size of the imaging lens or the projection lens.

Document 2 describes a prediction method of a speckle. This prediction method assumes that a pupil image has uniform illumination. However, in general, the pupil image of the projector has an illumination distribution. For this reason, it is not possible to use the prediction method of Document 2 practically.

SUMMARY

An aspect of the invention is to solve the problems described above and an object thereof is to provide a projector capable of reliably reducing speckle noise without causing an increase in the size of the device.

A projector according to a first aspect of the invention includes a laser light source device, a light diffusion device, a light modulation device, and a projection optical system. The laser light source device includes a first laser light source which emits red laser light, the light diffusion device includes a first light diffusion element which is provided on the optical path of the red laser light, and a first drive device which moves a position where the red laser light is incident on the first light diffusion element, the light modulation device includes a first light modulation element which is provided on the optical path of light emitted from the first light diffusion element, light emitted from the first light modulation element is incident on the projection optical system, and when the center coordinates of an illumination distribution of the red laser light in an exit pupil of the projection optical system are x=0 and y=0, normalized illumination at each coordinate is P(x,y), and a calculation range of integration is r (mm), EP determined from Expression (1) is EP≥35.

$$EP = \int_{-r}^{r}\int_{-r}^{r} \sqrt{x^2+y^2} P(x,y) dx dy \qquad (1)$$

The inventors have found that, when the exit pupil image of the projection optical system has an illumination distribution, there is a correlation between evaluation with EP represented by Expression (1) as an index and sensitive evaluation of speckle noise. The inventors have found that, as a result of an experiment, speckle contrast (hereinafter, abbreviated as SC) as an index of general speckle noise and EP have a correlation, and the degree of speckle noise can be predicted with the magnitude of EP. Specifically, when the value of EP is small, speckle noise is easily recognized, and when the value of EP is great, speckle noise is not easily recognized.

With the projector according to the first aspect of the invention, since the value of EP when red laser light is used satisfies EP≥35, it is possible to reduce speckle noise to the degree to be recognizable but not offensive to an observer. The experiment result showing the grounds for EP≥35 will be described below. In this way, with the projector according to the first aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the first aspect of the invention, it is preferable that EP determined based on the illumination distribution of the red laser light is EP≥51.

If the value of EP when the red laser light is used satisfies EP≥51, it is possible to reduce speckle noise to the degree to be hardly recognizable by the observer. The grounds for EP≥51 will be described below.

In the projector according to the first aspect of the invention, the laser light source device may include a second laser light source which emits green laser light, the light diffusion device may include a second light diffusion element which is provided on the optical path of the green laser light, and a second drive device which moves a position where the green laser light is incident on the second light diffusion element, the light modulation device may include a second light modulation element which is provided on the optical path of light emitted from the second light diffusion element, and light emitted from the second light modulation element may be incident on the projection optical system. In this case, it is preferable that, when the center coordinates of an illumination distribution of the green laser light in the exit pupil of the projection optical system are x=0 and y=0, normalized illumination at each coordinate is P(x,y), and a calculation range of integration is r (mm), EP determined from Expression (1) is EP≥27.

With the projector according to the first aspect of the invention, since the value of EP when the green laser light is used satisfies EP≥27, it is possible to reduce speckle noise to the degree to be recognizable but not offensive to the observer. The grounds for EP≥27 will be described below.

In the projector according to the first aspect of the invention, it is preferable that EP determined based on the illumination distribution of the green laser light is EP≥38.

If the value of EP when the green laser light is used satisfies EP≥38, it is possible to reduce speckle noise to the degree to be hardly recognizable by the observer. The grounds for EP≥38 will be described below.

In the projector according to the first aspect of the invention, the laser light source device may include a third laser light source which emits blue laser light, the light diffusion device may include a third light diffusion element which is provided on the optical path of the blue laser light, and a third drive device which moves a position where the blue laser light is incident on the third light diffusion element, the light modulation device may include a third light modulation element which is provided on the optical path of light emitted from the third light diffusion element, and light emitted from the third light modulation element may be incident on the projection optical system. In this case, it is preferable that, when the center coordinates of an illumination distribution of the blue laser light in the exit pupil of the projection optical system are x=0 and y=0, normalized illumination at each coordinate is P(x,y), and a calculation range of integration is r (mm), EP determined from Expression (1) is EP≥16.

With the projector according to the first aspect of the invention, since the value of EP when the blue laser light is used satisfies EP≥16, it is possible to reduce speckle noise to the degree to be recognizable but not offensive to the observer. The grounds for EP≥16 will be described below.

In the projector according to the first aspect of the invention, it is preferable that EP determined based on the illumination distribution of the blue laser light is EP≥26.

If the value of EP when the blue laser light is used satisfies EP≥26, it is possible to reduce speckle noise to the degree to be hardly recognizable by the observer. The grounds for EP≥26 will be described below.

A projector according to a second aspect of the invention includes a laser light source which emits green laser light, a light diffusion element which is provided on the optical path of the green laser light, a drive device which moves a position where the green laser light is incident on the light diffusion element, a light modulation element which is provided on the optical path of light emitted from the light diffusion element, and a projection optical system on which light emitted from the light modulation element is incident. When the center coordinates of an illumination distribution of the green laser light in an exit pupil of the projection optical system are x=0 and y=0, normalized illumination at each coordinate is P(x,y), and a calculation range of integration is r (mm), EP determined from Expression (1) is EP≥27.

$$EP = \int_{-r}^{r}\int_{-r}^{r} \sqrt{x^2+y^2} P(x,y) dx dy \quad (1)$$

With the projector according to the second aspect of the invention, since the value of EP when the green laser light is used satisfies EP≥27, it is possible to reduce speckle noise to the degree to be recognizable but not offensive to the observer. In this way, with the projector according to the second aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the second aspect of the invention, it is preferable that EP≥38.

If the value of EP when the green laser light is used satisfies EP≥38, it is possible to reduce speckle noise to the degree to be hardly recognizable by the observer.

A projector according to a third aspect of the invention includes a laser light source which emits blue laser light, a light diffusion element which is provided on the optical path of the blue laser light, a drive device which moves a position where the blue laser light is incident on the light diffusion element, a light modulation element which is provided on the optical path of light emitted from the light diffusion element, and a projection optical system on which light emitted from the light modulation element is incident. When the center coordinates of an illumination distribution of the blue laser light in an exit pupil of the projection optical system are x=0 and y=0, normalized illumination at each coordinate is P(x,y), and a calculation range of integration is r (mm), EP determined from Expression (1) is EP≥16.

$$EP = \int_{-r}^{r}\int_{-r}^{r} \sqrt{x^2+y^2} P(x,y) dx dy \quad (1)$$

With the projector according to the third aspect of the invention, since the value of EP when the blue laser light is used satisfies EP≥16, it is possible to reduce speckle noise to the degree to be recognizable but not offensive to the observer. In this way, with the projector according to the third aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the third aspect of the invention, it is preferable that EP≥26.

If the value of EP when the blue laser light is used satisfies EP≥26, it is possible to reduce speckle noise to the degree to be hardly recognizable by the observer.

A projector according to a fourth aspect of the invention includes a laser light source device including a first laser light source which emits red laser light, a light modulation device including a first light modulation element which is provided on the optical path of the red laser light, and a projection optical system on which light emitted from the first light modulation element is incident. When the center coordinates of an illumination distribution of the red laser light in an exit pupil of the projection optical system are x=0 and y=0, normalized illumination at each coordinate is P(x,y), and a calculation range of integration is r (mm), EP determined from Expression (1) is EP≥79.

$$EP = \int_{-r}^{r}\int_{-r}^{r} \sqrt{x^2+y^2} P(x,y) dx dy \quad (1)$$

With the projector according to the fourth aspect of the invention, since the value of EP when the red laser light is used satisfies EP≥79, it is possible to reduce speckle noise to the degree to be recognizable but not offensive to the observer. In this way, with the projector according to the fourth aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the fourth aspect of the invention, it is preferable that EP determined based on the illumination distribution of the red laser light is EP≥119.

If the value of EP when the red laser light is used satisfies EP≥119, it is possible to reduce speckle noise to the degree to be hardly recognizable by the observer.

In the projector according to the fourth aspect of the invention, the laser light source device may further include a second laser light source which emits green laser light, the light modulation device may further include a second light modulation element which is provided on the optical path of the green laser light, and light emitted from the second light modulation element may be incident on the projection optical system. In this case, it is preferable that, when the center coordinates of an illumination distribution of the green laser light in the exit pupil of the projection optical system are x=0 and y=0, normalized illumination at each coordinate is P(x,y), and a calculation range of integration is r (mm), EP determined from Expression (1) is EP≥65.

With the projector according to the fourth aspect of the invention, since the value of EP when the green laser light is used satisfies EP≥65, it is possible to reduce speckle noise to the degree to be recognizable but not offensive to the observer.

In the projector according to the fourth aspect of the invention, it is preferable that EP determined based on the illumination distribution of the green laser light is EP≥93.

If the value of EP when the green laser light is used satisfies EP≥93, it is possible to reduce speckle noise to the degree to be hardly recognizable by the observer.

In the projector according to the fourth aspect of the invention, the laser light source device may further include a third laser light source which emits blue laser light, the light modulation device may further include a third light modulation element which is provided on the optical path of the blue laser light, and light emitted from the third light modulation element may be incident on the projection optical system. In this case, it is preferable that, when the center coordinates of an illumination distribution of the blue laser light in the exit pupil of the projection optical system are x=0 and y=0, normalized illumination at each coordinate is P(x,y), and a calculation range of integration is r (mm), EP determined from Expression (i) is EP≥45.

With the projector according to the fourth aspect of the invention, since the value of EP when the blue laser light is used satisfies EP≥45, it is possible to reduce speckle noise to the degree to be recognizable but not offensive to the observer.

In the projector according to the fourth aspect of the invention, it is preferable that EP determined based on the illumination distribution of the blue laser light is EP≥59.

If the value of EP when the blue laser light is used satisfies EP≥59, it is possible to reduce speckle noise to the degree to be hardly recognizable by the observer.

A projector according to a fifth aspect of the invention includes a laser light source which emits green laser light, a light modulation element which is provided on the optical path of the green laser light, and a projection optical system on which light emitted from the light modulation element is incident. When the center coordinates of an illumination distribution of the green laser light in an exit pupil of the projection optical system are x=0 and y=0, normalized illumination at each coordinate is P(x,y), and a calculation range of integration is r (mm), EP determined from Expression (1) is EP≥65.

$$EP = \int_{-r}^{r}\int_{-r}^{r} \sqrt{x^2+y^2}\,P(x,y)\,dx\,dy \qquad (1)$$

With the projector according to the fifth aspect of the invention, since the value of EP when the green laser light is used satisfies EP≥65, it is possible to reduce speckle noise to the degree to be recognizable but not offensive to the observer. In this way, with the projector according to the fifth aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the fifth aspect of the invention, it is preferable that EP≥93.

If the value of EP when the green laser light is used satisfies EP≥93, it is possible to reduce speckle noise to the degree to be hardly recognizable by the observer.

A projector according to a sixth aspect of the invention includes a laser light source which emits blue laser light, a light modulation element which is provided on the optical path of the blue laser light, and a projection optical system on which light emitted from the light modulation element is incident. When the center coordinates of an illumination distribution of the blue laser light in an exit pupil of the projection optical system are x=0 and y=0, normalized illumination at each coordinate is P(x,y), and a calculation range of integration is r (mm), EP determined from Expression (1) is EP≥45.

$$EP = \int_{-r}^{r}\int_{-r}^{r} \sqrt{x^2+y^2}\,P(x,y)\,dx\,dy \qquad (1)$$

With the projector according to the sixth aspect of the invention, since the value of EP when the blue laser light is used satisfies EP≥45, it is possible to reduce speckle noise to the degree to be recognizable but not offensive to the observer. In this way, with the projector according to the sixth aspect of the invention, it is possible to reduce speckle noise by adjusting the illumination distribution of the exit pupil image of the projection optical system, and it is not necessary to add a member, such as a rotation plate. For this reason, it is possible to provide a projector capable of reliably reducing speckle noise without causing an increase in the size of the device.

In the projector according to the sixth aspect of the invention, it is preferable that EP≥59.

If the value of EP when the green laser light is used satisfies EP≥59, it is possible to reduce speckle noise to the degree to be hardly recognizable by the observer.

In the projector according to any one of the first to sixth aspects of the invention, it is preferable that the normalized illumination P(x,y) is expressed by Expression (2).

$$P(x,y) = \text{illumination (cd/m}^2\text{)/average illumination} \\ \text{(cd/m}^2\text{) of the top 0.1\% in an illumination distribution of a pupil diameter} \qquad (2)$$

The normalized illumination is calculated by Expression (2), whereby it is possible to obtain an evaluation result with high accuracy, for example, as a value in consideration of the distribution of a high illumination component in the illumination distribution in the exit pupil of the projection optical system.

In the projector according to any one of the first to sixth aspects of the invention, a value integrated over a unit time may be used as the normalized illumination P(x,y).

With this configuration, even when the illumination distribution in the exit pupil of the projection optical system changes over time, it is possible to obtain an evaluation result with high accuracy.

In the projector according to any one of the first to sixth aspects of the invention, it is preferable that the laser light source device is a multimode semiconductor laser light source.

In the case of the multimode semiconductor laser light source, for example, since a coherent length is short and a wavelength width is wide compared to a single-mode semiconductor laser light source, a semiconductor-pumped solid-state (DPSS) laser, or the like, it is possible to effectively reduce speckle noise.

DESCRIPTION OF EXEMPLARY EMBODIMENTS

First Embodiment

Hereinafter, a first embodiment of the invention will be described referring to FIGS. 1 to 6.

In this embodiment, an example of a projector using a laser light source device is shown.

Figure 1:
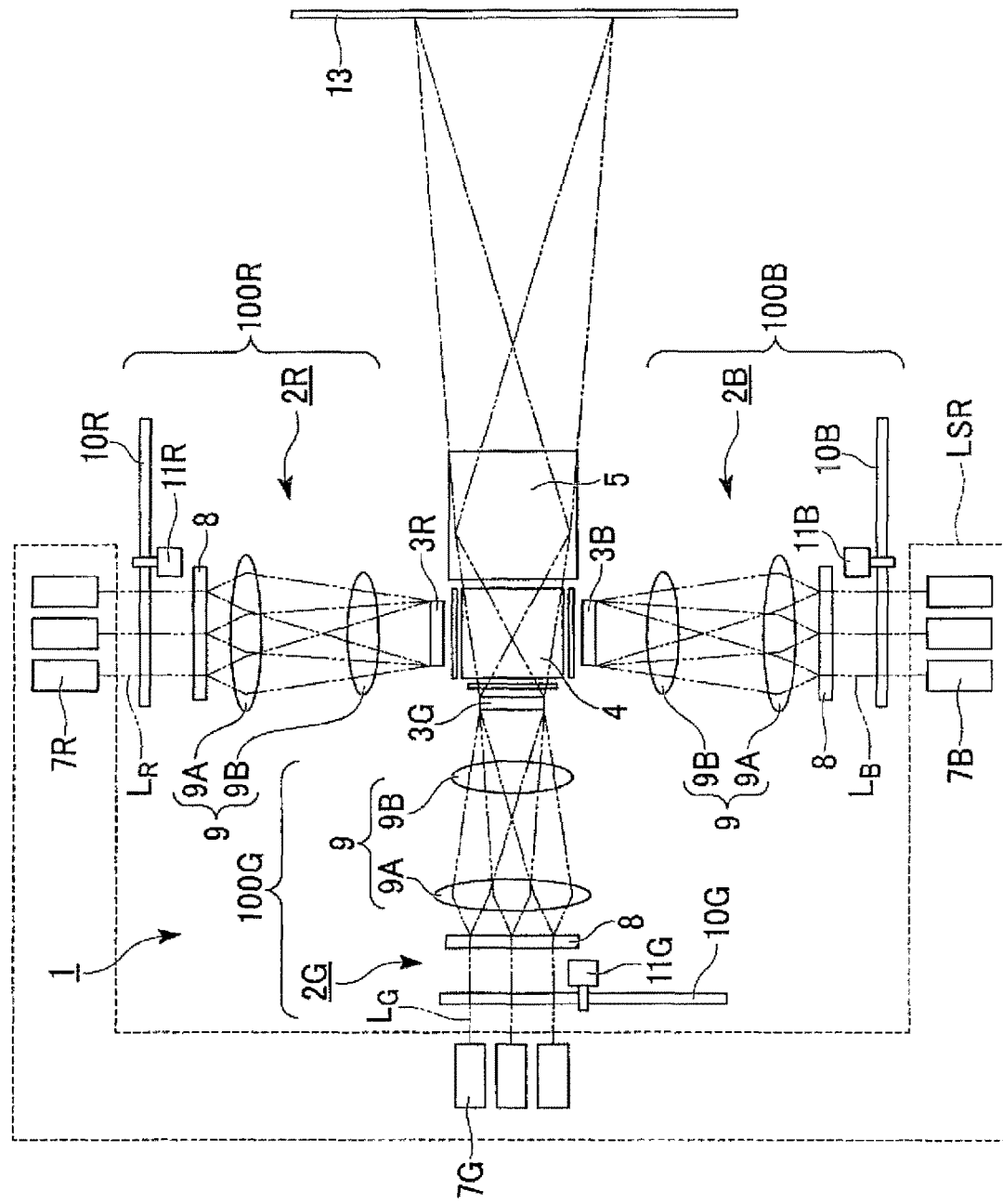
FIG. 1 is a schematic configuration diagram showing a projector according to a first embodiment of the invention.

FIG. 1 is a schematic configuration diagram showing a projector according to the first embodiment of the invention.

In the following drawings, for ease of visual recognition of the respective constituent elements, the constituent elements may be different in scale.

As shown in FIG. 1, a projector 1 includes a laser light source device LSR, an illumination optical system 100R, an illumination optical system 100G, an illumination optical system 100B, a red liquid crystal light valve (first light modulation element) 3R, a green liquid crystal light valve (second light modulation element) 3G, a blue liquid crystal light valve (third light modulation element) 3B, a color composition element 4, and a projection optical system 5.

The laser light source device LSR includes at least one red laser light source (first laser light source) 7R, at least one green laser light source (second laser light source) 7G, and at least one blue laser light source (third laser light source) 7B. Each of the red laser light source 7R, the green laser light source 7G, and the blue laser light source 7B is a multimode semiconductor laser.

The illumination optical system 100R includes a diffraction optical element 8, a superposition optical system 9, a first light diffusion element 10R, and a first drive device 11R.

The illumination optical system 100G includes a diffraction optical element 8, a superposition optical system 9, a second light diffusion element 10G, and a second drive device 11G.

The illumination optical system 100B includes a diffraction optical element 8, a superposition optical system 9, a third light diffusion element 10B, and a third drive device 11B.

In this embodiment, a light diffusion device includes the first light diffusion element 10R, the second light diffusion element 10G, the third light diffusion element 10B, the first drive device 11R, the second drive device 11G, and the third drive device 11B. A light modulation device includes the red liquid crystal light valve 3R, the green liquid crystal light valve 3G, and the blue liquid crystal light valve 3B.

In the following description, the first light diffusion element 10R, the second light diffusion element 10G, and the third light diffusion element 10B are referred to as a light diffusion element 10, and the first drive device 11R, the second drive device 11G, and the third drive device 11B are referred to as a drive device 11.

A plurality of red laser light sources 7R and the illumination optical system 100R corresponding to a plurality of red laser light sources 7R constitute a red light source device 2R. A plurality of green laser light sources 7G and the illumination optical system 100G corresponding to a plurality of green laser light sources 7G constitute a green light source device 2G. A plurality of blue laser light sources 7B and the illumination optical system 100B corresponding to a plurality of blue laser light sources 7B constitute a blue light source device 2B.

In summary, the projector 1 operates as follows.

Red laser light $L_R$ emitted from the red light source device 2R is incident on the red liquid crystal light valve 3R and modulated. Similarly, green laser light $L_G$ emitted from the green light source device 2G is incident on the green liquid crystal light valve 3G and modulated. Blue laser light $L_B$ emitted from the blue light source device 2B is incident on the blue liquid crystal light valve 3B and modulated. Red laser light $L_R$ modulated by the red liquid crystal light valve 3R, green light $L_G$ modulated by the green liquid crystal light valve 3G, and blue light $L_B$ modulated by the blue liquid crystal light valve 3B are incident on the color composition element 4 and composed. Light (image light) composed by the color composition element 4 is projected onto a screen 13 by the projection optical system 5 on a magnified scale. In this way, a full-color projection image is displayed.

Hereinafter, the respective constituent elements of the projector 1 will be described.

The red light source device 2R, the green light source device 2G, and the blue light source device 2B have the same configuration but are different in emitted light color. Accordingly, in the following description, only the red light source device 2R will be described, and description of the green light source device 2G and the blue light source device 2B will be omitted.

The red light source device 2R includes a plurality of red laser light sources 7R. In FIG. 1, although the red light source device 2R includes three red laser light sources 7R, the number of red laser light sources 7R is not particularly limited to three. A plurality of red laser light sources 7R are arranged not only in a direction parallel to the paper surface but also in a direction perpendicular to the paper surface, and may be arranged in an array as a whole. The same applies to the green light source device 2G and the blue light source device 2B. As an example, the red laser light source 7R emits light in a wavelength region of about 585 nm to 720 nm. The green laser light source 7G emits light in a wavelength region of about 495 nm to 585 nm. The blue laser light source 7B emits light in a wavelength region of about 380 nm to 495 nm.

Each red laser light source 7R may include a collimator lens (not shown). When each red laser light source 7R includes the collimator lens, the emitted red laser light $L_R$ is incident on the collimator lens, parallelized, and emitted. The same applies to the green laser light source 7G and the blue laser light source 7B.

The red laser light $L_R$ emitted from the red laser light source 7R is incident on the light diffusion element 10. The light diffusion element 10 expands the emission angle distribution of light emitted from the light diffusion element 10 with respect to the incidence angle distribution of light incident on the light diffusion element 10. The light diffusion element 10 can be constituted of, for example, a light diffusion plate, such as frosted glass or a diffusion film, a diffraction optical element, such as a holographic diffuser, a lens component, such as a microlens array, or the like.

The light diffusion element 10 has a rotation shaft which passes through the center of the substrate and extends in a direction normal to the substrate. The rotation shaft is connected to a motor which is the drive device 11 of the light diffusion element 10. The operation of the drive device 11 causes the light diffusion element 10 to rotate around the rotation shaft. The light diffusion element 10 is provided to uniformize the luminous intensity distribution of light projected onto the screen 13 and to reduce speckle noise. The rotation of the light diffusion element 10 allows a momentarily changing spatial distribution of speckle noise to be superposed with time and speckle noise to be further reduced.

The red laser light $L_R$ emitted from the light diffusion element 10 is incident on the diffraction optical element 8. The diffraction optical element 8 is made of a computer generated hologram (CGH). The CGH is, for example, a surface relief type hologram element in which minute unevenness designed by a computer is provided in the surface of a base material made of a light transmissive material, such as quartz (glass) or synthetic resin. The diffraction optical element 8 diffracts the incident red laser light $L_R$, thereby uniformizing the intensity distribution of the red laser light $L_R$ incident on the red liquid crystal light valve 3R described below and increasing the use efficiency of the red laser light $L_R$ incident on the red liquid crystal light valve 3R. Diffracted light emitted from the diffraction optical element 8 is incident on the superposition optical system 9.

The superposition optical system 9 has at least one superposition lens. The superposition optical system 9 superposes a plurality of light beams emitted from the diffraction optical element 8 on a liquid crystal light valve as a region to be illuminated. Here, an example of the superposition optical system 9 having two superposition lenses of a first superposition lens 9A and a second superposition lens 9B is shown. A plurality of light beams of the red laser light $L_R$ emitted from the diffraction optical element 8 is incident on the red liquid crystal light valve 3R through the superposition optical system 9. A plurality of light beams are superposed on one another on the red liquid crystal light valve 3R by the superposition optical system 9. With this, the luminance distribution of light illuminating the red liquid crystal light valve 3R is uniformized, and axis symmetry around the ray axis is increased.

Though not shown, the red liquid crystal light valve 3R includes a liquid crystal panel with a liquid crystal layer interposed between a pair of glass substrates, a light incidence side polarizing plate disposed on the light incident side of the liquid crystal panel, and a light emission side polarizing plate disposed on the light emission side of the liquid crystal panel. The mode of the liquid crystal layer is a TN mode, a VA mode, a transverse electric field mode, or the like, and is not particularly limited. The green liquid crystal light valve 3G and the blue liquid crystal light valve 3B have the same configuration.

The color composition element 4 is constituted of a cross dichroic prism or the like. The cross dichroic prism has a structure in which four triangular prisms are laminated with one another. The surface to be laminated in the triangular prism becomes the inner surface of the cross dichroic prism. In the inner surface of the cross dichroic prism, a mirror surface on which red light is reflected and green light is transmitted is orthogonal to a mirror surface on which blue light is reflected and green light is transmitted. The green light incident on the cross dichroic prism is transmitted through the mirror surface and emitted directly. The red light and the blue light incident on the cross dichroic prism are selectively reflected on the mirror surface and emitted in the same direction as the emission direction of the green light. In this way, the three color light components are superposed and composed, and the composed color light is emitted toward the projection optical system 5.

Figure 2:
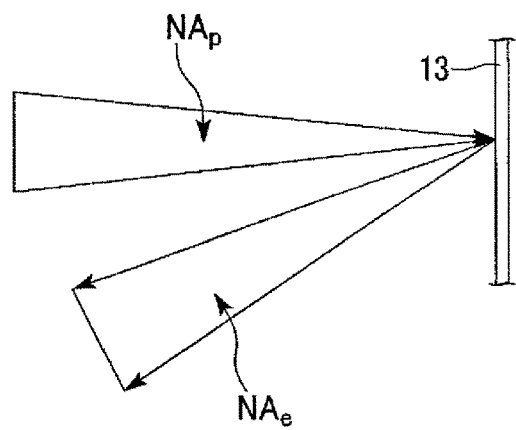
FIG. 2 is a diagram illustrating SC.

In the projector 1 configured as above, as shown in FIG. 2, when a numerical aperture on a projection side when light from the projection optical system 5 is incident on the screen 13 is NAp, and a numerical aperture on an observation side when light from the screen 13 is emitted is NAe, speckle contrast SC is expressed by Expression (2).

$$SC = \frac{1}{\sqrt{K}} = \frac{NA_e}{NA_p} \quad (2)$$

As will be apparent from Expression (2), when the observation-side numerical aperture NAe is constant, speckle contrast SC is determined by the projection-side numerical aperture NAp. In the projector, the projection-side numerical aperture NAp is determined by the distance between the exit pupil of the projection optical system and the screen and the size of the exit pupil. The observation-side numerical aperture NAe is determined by the distance between the observer and the screen and the size of the pupil of the observer. However, for calculating speckle contrast SC using Expression (2), it is assumed that the illumination distribution of the pupil image in the exit pupil of the projection optical system is uniform within the range of the projection-side numerical aperture NAp. However, the actual exit pupil image of the projector has an illumination distribution shown in FIG. 4, and illumination is not uniform. For this reason, the assumption of Expression (2) is not satisfied, and it is not possible to accurately calculate speckle contrast SC.

Figure 3:
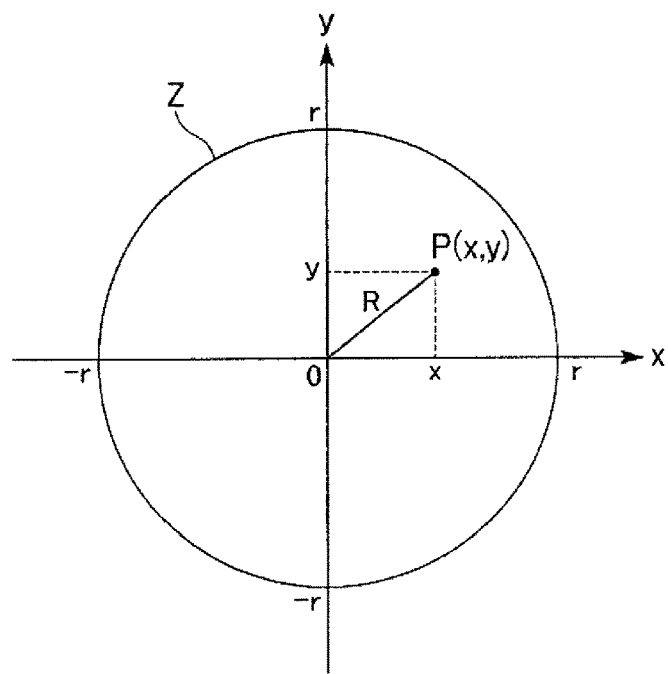
FIG. 3 is a diagram showing the coordinate axes of an illumination distribution in a calculation expression of EP.

Accordingly, the inventors have experimentally reached an expression of determining an index capable of evaluating speckle noise with excellent accuracy even if the exit pupil image has an illumination distribution. As shown in FIG. 3, the orthogonal axes with the center of an exit pupil image Z as the origin O of the coordinates are referred to as the x axis and the y axis. At this time, normalized illumination at the point of the coordinates (x,y) is represented as P(x,y). The inventors have decided to call the index represented by Expression (1) EP (Effective Pupil).

$$EP=\int_{-r}^{r}\int_{-r}^{r}\sqrt[4]{x^2+y^2}P(x,y)dxdy \qquad (1)$$

The normalized illumination P(x,y) is determined by Expression (3).

$$P(x,y)=\text{illumination (cd/m}^2\text{)/average illumination (cd/m}^2\text{) of the top 0.1\% in the illumination distribution of the exit pupil image} \qquad (3)$$

In Expression (1), it is possible to calculate EP using the normalized illumination, instead of absolute illumination, without depending on brightness of the exit pupil image. For calculating the normalized illumination, the average illumination of the top 0.1% of brightness of the exit pupil image is used, whereby it is possible to further increase the accuracy of the calculation result of EP. The reason is as follows.

Speckle noise refers to that the difference between the levels of illumination is recognized as a speckle by human eyes. A portion with high illumination causes a bright interference speckle, and a portion with low illumination causes a dark interference speckle. Speckle noise caused by interference of a portion with high illumination is easily recognized by the human. That is, speckle noise is more significantly affected by the portion with high illumination than the portion with low illumination.

Figure 4:
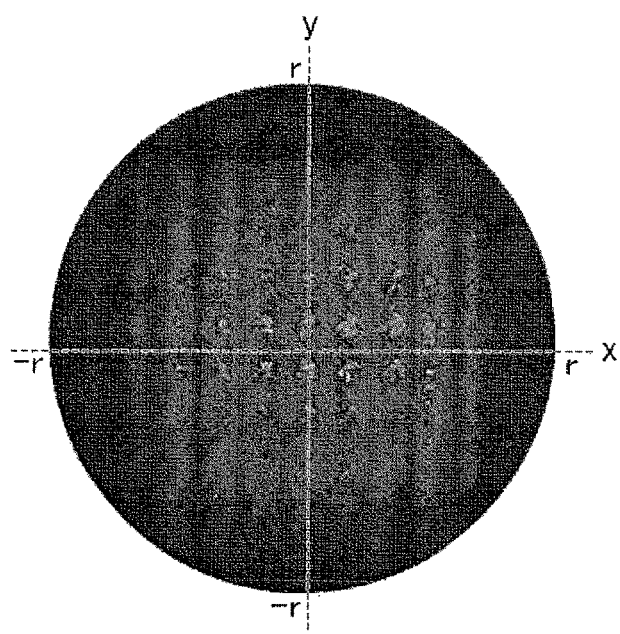
FIG. 4 is a diagram showing an example of an illumination distribution.
Figure 5:
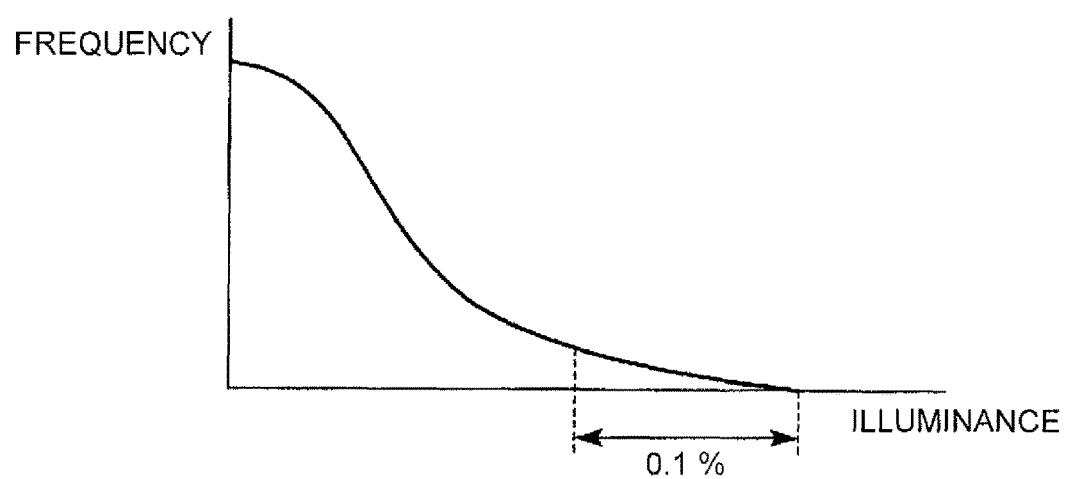
FIG. 5 is a diagram showing an example of a histogram of illumination.

For example, FIG. 5 shows the illumination distribution of the exit pupil image shown in FIG. 4 by a histogram. The horizontal axis of the graph represents illumination, and the vertical axis represents frequency. In this way, a high illumination component is distributed at the bottom on the right side of the graph. As the calculation method of the normalized illumination, for example, a case where the maximum value of illumination in the illumination distribution is used as a reference is considered. However, when a very high illumination component is included in the illumination distribution due to the occurrence of spike, or the like, in this calculation method, an illumination distribution in a high illumination region is not correctly reflected in the calculation result of EP. For this reason, it is not possible to calculate the value of EP optimized for human eyes. In contrast, the inventors have found from the experiment result that the value of EP properly reflected with the illumination distribution in the high illumination region is obtained by calculating the normalized illumination with the average illumination of the top 0.1% of brightness as a reference.

Figure 6:
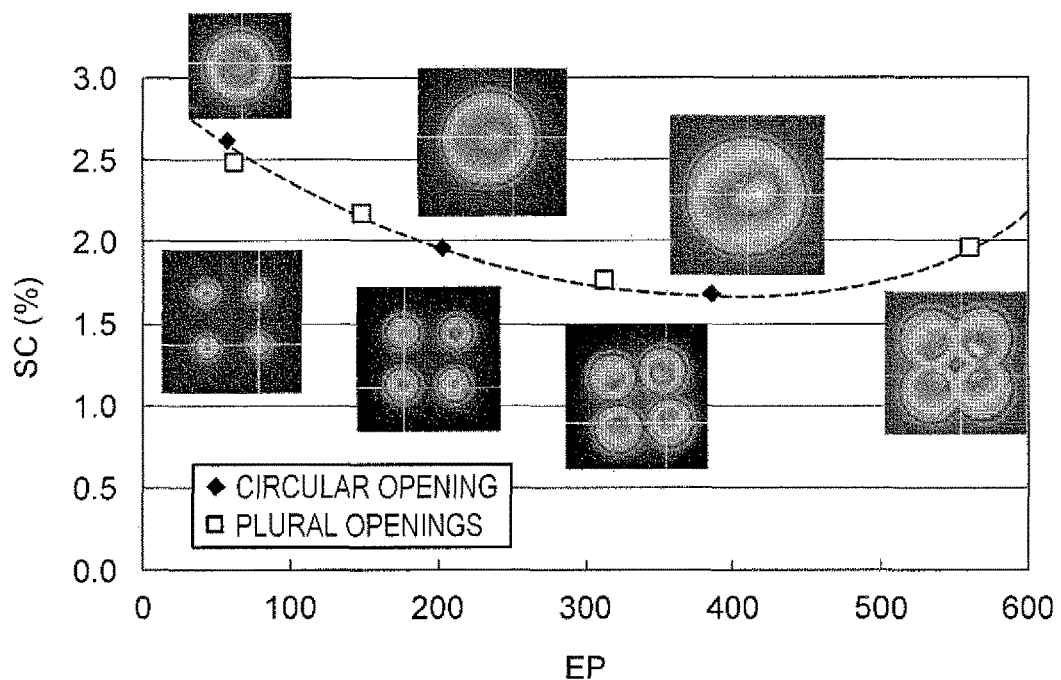
FIG. 6 is a graph showing the relationship between EP and SC.

The inventors have experimentally generated an exit pupil image when transmitted through one circular aperture and an exit pupil image when transmitted through multiple circular apertures and have obtained the correlation between SC and EP. The result is shown in FIG. 6. The horizontal axis in FIG. 6 represents EP, and the vertical axis represents SC. In this way, even if the shape of the exit pupil image is different, it has been found that there is the correlation between SC and EP indicated by a broken-line curve. That is, it has been found that SC can be predicted using EP calculated using Expression (1).

The inventors have performed sensitive evaluation of speckle noise by multiple subjects.

In the projector 1 of the first embodiment, a time superposition effect of speckle noise has been evaluated by comparing speckle noise when the light diffusion element 10 is not rotated with speckle noise when the light diffusion element 10 is rotated. When the light diffusion element 10 is not rotated, the time superposition effect of speckle noise is not included, and when the light diffusion element 10 is rotated, the time superposition effect of speckle noise is included.

Figure 7:
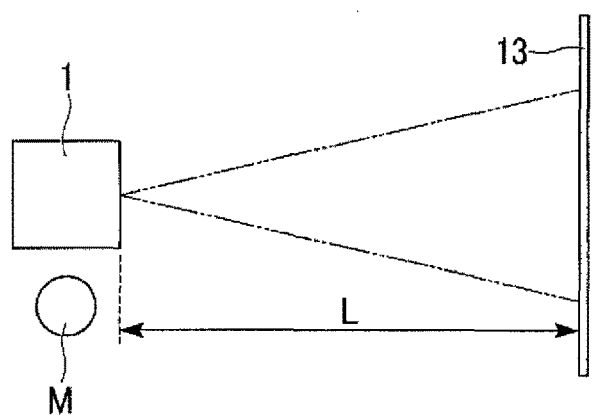
FIG. 7 is a diagram showing the positional relationship of a projector, a subject, and a screen in an example.

As the conditions for evaluation, as shown in FIG. 7, the distance L between the exit pupil image of the projector 1 and the screen 13 was set 2 m, and the distance between a subject M and the screen 13 was set to 2 m. The reason that the distances are set to 2 m is because it is assumed that the projector 1 is used in a conference or the like. For the screen 13, a white mat screen was used.

For example, the intensity distribution of the exit pupil image was adjusted by changing the interval among a plurality of red laser light components emitted from the laser light source device LSR with respect to red light. The intensity distribution of the exit pupil image was adjusted in a similar manner for other color light components. In this way, the value of EP was adjusted by adjusting the intensity distribution of the exit pupil image.

First, red light having a center wavelength of 638 nm was emitted from the projector 1, and sensitive evaluation of speckle noise was performed. Table 1 and Table 2 show the result of evaluating how much speckle noise is obstructive by the eyes of the multiple subjects when the exit pupil image is changed in various ways.

Table 1 shows the calculation result of SC and EP when the light diffusion element is not rotated and the result of subjective evaluation of the subjects. Table 2 shows the calculation result of SC and EP when the light diffusion element is rotated and the result of subjective evaluation of the subjects. In the column of subjective evaluation of Table 1 and Table 2, "x" indicates that speckle noise is offensive to all subjects, "Δ" indicates that speckle noise is recognized by about half of the subjects but not offensive, and "○" indicates that speckle noise is substantially not recognized by all subjects.

TABLE 1

| SC | EP | Subjective Evaluation |
|---|---|---|
| 5.5% | 6 | x |
| 5.0% | 13 | x |
| 3.5% | 17 | x |
| 3.0% | 19 | x |
| 2.8% | 27 | x |
| 3.0% | 26 | x |
| 2.5% | 35 | x |
| 2.0% | 51 | x |
| 1.7% | 79 | Δ |
| 1.5% | 119 | ○ |

TABLE 2

| SC | EP | Subjective Evaluation |
|---|---|---|
| 3.0% | 6 | x |
| 2.6% | 13 | x |
| 2.0% | 17 | x |
| 2.0% | 19 | x |
| 1.8% | 26 | x |
| 2.0% | 27 | x |
| 1.7% | 35 | Δ |
| 1.5% | 51 | ○ |
| 1.2% | 80 | ○ |
| 1.0% | 119 | ○ |

Figure 8:
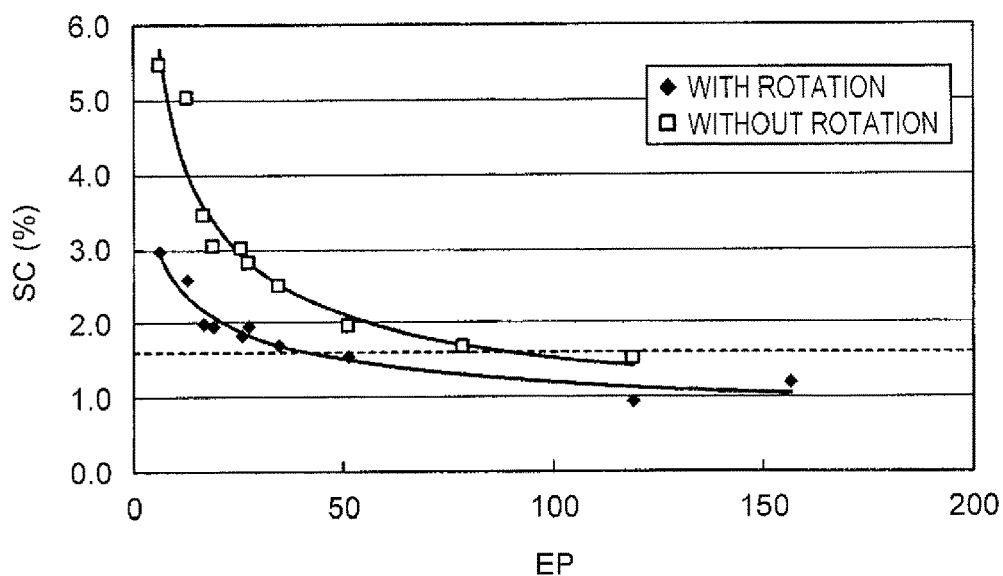
FIG. 8 is a graph showing the correlation of EP and SC in a first example.

FIG. 8 shows the evaluation results of Table 1 and Table 2 into a graph. The horizontal axis of the graph represents EP, and the vertical axis of the graph represents SC. A lower region of a line indicated by a broken line corresponds to the regions of "Δ" and "○" of Table 1 and Table 2. In this way, it has been understood that, when SC is equal to or less than a predetermined value, speckle noise is recognized but not offensive.

From the above evaluation results, when SC is equal to or less than 1.7%, speckle noise is not offensive to about half of the subjects. At this time, EP was equal to or greater than 79 when the light diffusion element was not rotated, and was equal to or greater than 35 when the light diffusion element was rotated. Furthermore, when SC is equal to or less than 1.5%, speckle noise is not recognized by all subjects. At this time, EP was equal to or greater than 119 when the light diffusion element was not rotated, and was equal to or greater than 51 when the light diffusion element was rotated.

Next, green light having a center wavelength of 520 nm was emitted from the projector 1, and sensitive evaluation of speckle noise was performed.

Table 3 shows the calculation result of SC and EP when the light diffusion element is not rotated and the result of subjective evaluation of the subjects. Table 4 shows the calculation result of SC and EP when the light diffusion element is rotated and the result of subjective evaluation of the subjects. In the column of subjective evaluation of Table 3 and Table 4, "x" indicates that speckle noise is offensive to all subjects, "Δ" indicates that speckle noise is recognized by about half of the subjects but not offensive, and "○" indicates that speckle noise is substantially not recognized by all subjects.

TABLE 3

| SC | EP | Subjective Evaluation |
|---|---|---|
| 4.8% | 7 | x |
| 2.8% | 27 | x |
| 2.3% | 38 | x |
| 1.7% | 65 | Δ |
| 1.4% | 93 | ○ |

TABLE 4

| SC | EP | Subjective Evaluation |
|---|---|---|
| 2.7% | 7 | x |
| 1.8% | 27 | Δ |
| 1.6% | 38 | ○ |
| 1.2% | 93 | ○ |

Figure 9:
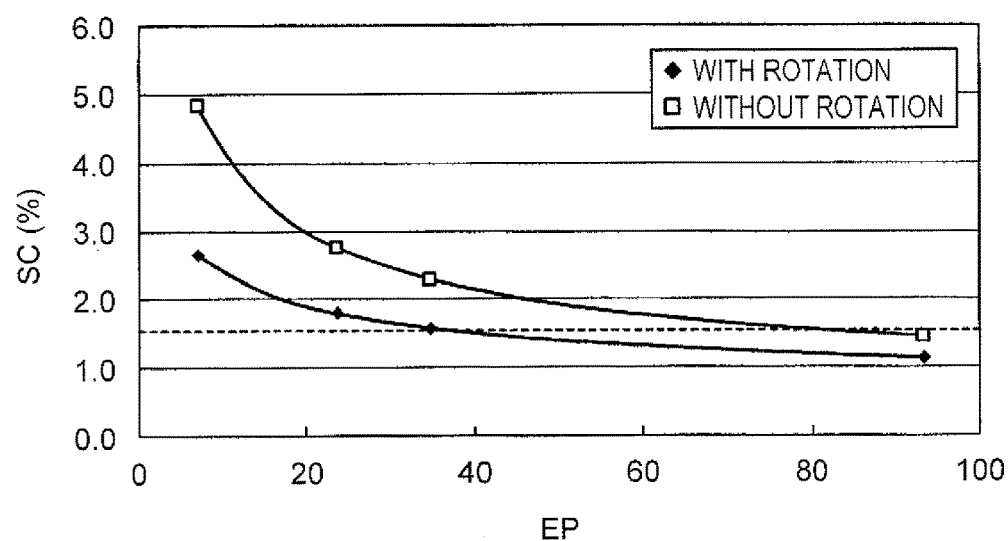
FIG. 9 is a graph showing the correlation of EP and SC in a second example.

FIG. 9 shows the evaluation results of Table 3 and Table 4 into a graph. The horizontal axis of the graph represents EP, and the vertical axis of the graph represents SC. A lower region of a line indicated by a broken line corresponds to the regions of "Δ" and "○" of Table 3 and Table 4. In this way, it has been understood that, when SC is equal to or less than a predetermined value, speckle noise is recognized but not offensive.

From the above evaluation results, when SC is equal to or less than 1.8%, speckle noise is not offensive to about half of the subjects. At this time, EP was equal to or greater than 65 when the light diffusion element was not rotated, and was equal to or greater than 27 when the light diffusion element was rotated. Furthermore, when SC is equal to or less than 1.6%, speckle noise is not recognized by all subjects. At this time, EP was equal to or greater than 93 when the light diffusion element was not rotated, and was equal to or greater than 38 when the light diffusion element was rotated.

Next, blue light having a center wavelength of 445 nm was emitted from the projector 1, and sensitive evaluation of speckle noise was performed.

Table 5 shows the calculation result of SC and EP when the light diffusion element is not rotated and the result of subjective evaluation of the subjects. Table 6 shows the calculation result of SC and EP when the light diffusion element is rotated and the result of subjective evaluation of the subjects. In the column of subjective evaluation of Table 5 and Table 6, "x" indicates that speckle noise is offensive to all subjects, "Δ" indicates that speckle noise is recognized by about half of the subjects but not offensive, and "○" indicates that speckle noise is substantially not recognized by all subjects.

TABLE 5

| SC | EP | Subjective Evaluation |
|---|---|---|
| 6.4% | 3.44 | x |
| 4.9% | 6 | x |
| 4.1% | 8.67 | x |
| 3.8% | 10.65 | x |
| 1.9% | 45 | Δ |
| 1.7% | 59 | ○ |
| 1.5% | 78 | ○ |
| 1.3% | 95.41 | ○ |
| 1.2% | 112 | ○ |

TABLE 6

| SC | EP | Subjective Evaluation |
|---|---|---|
| 3.5% | 2.64 | x |
| 3.2% | 3.44 | x |
| 2.7% | 6 | x |
| 1.9% | 16 | Δ |
| 1.7% | 26 | ○ |
| 1.2% | 78 | ○ |
| 1.1% | 95.41 | ○ |

Figure 10:
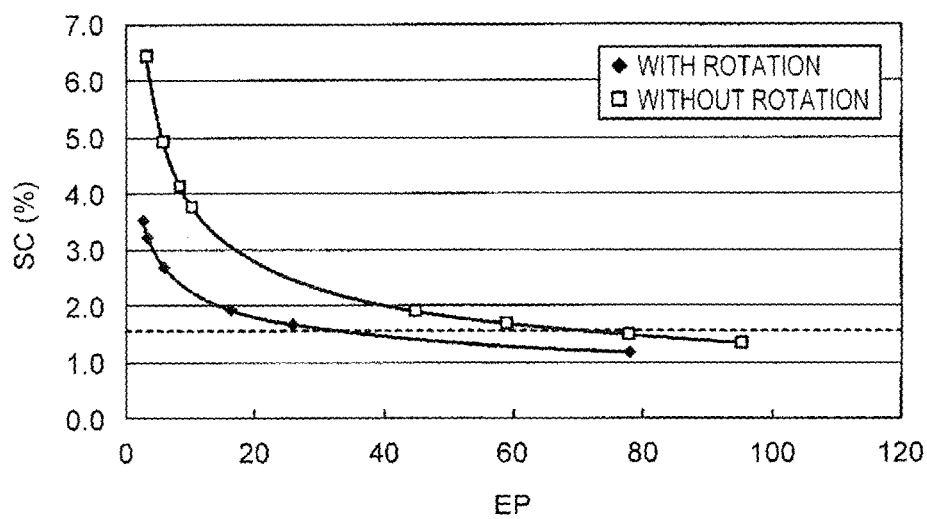
FIG. 10 is a graph showing the correlation of EP and SC in a third example.

FIG. 10 shows the evaluation results of Table 5 and Table 6 into a graph. The horizontal axis of the graph represents EP, and the vertical axis of the graph represents SC. A lower region of a line indicated by a broken line corresponds to the regions of "Δ" and "○" of Table 5 and Table 6. In this way, it has been understood that, when SC is equal to or less than a predetermined value, speckle noise is recognized but not offensive.

From the above evaluation results, when SC is equal to or less than 1.9%, speckle noise is not offensive to about half of the subjects. At this time, EP was equal to or greater than 45 when the light diffusion element was not rotated, and was equal to or greater than 16 when the light diffusion element was rotated. Furthermore, when SC is equal to or less than 1.7%, speckle noise is not recognized by all subjects. At this time, EP was equal to or greater than 59 when the light diffusion element was not rotated, and was equal to or greater than 26 when the light diffusion element was rotated.

The above evaluation results were revised and summarized in a table as follows.

Even if speckle noise is recognized by human eyes, if the value of EP is determined such that speckle noise does not become the level to be not offensive practically, Table 7 is obtained. More preferably, if the value of EP is determined such that speckle noise becomes the level to be not substantially recognizable by human eyes, Table 8 is obtained.

TABLE 7

|              | Not Rotated | Rotated |
|--------------|-------------|---------|
| Red (638 nm) | 79          | 35      |
| Green (520 nm) | 65        | 27      |
| Blue (445 nm) | 45         | 16      |

TABLE 8

|              | Not Rotated | Rotated |
|--------------|-------------|---------|
| Red (638 nm) | 119         | 51      |
| Green (520 nm) | 93        | 38      |
| Blue (445 nm) | 59         | 26      |

The reason that the target value of EP is different according to the color (wavelength region) of laser light is because the size of a speckle depends on a wavelength. When the wavelength is shorter, the size of a speckle is smaller. If a speckle is equal to or smaller than a given size, the speckle is hardly recognized by human eyes. Furthermore, since blue light has low sensitivity to human eyes, speckle noise is hardly recognized in blue light. For this reason, the target value of EP in blue light is smaller than the target value of EP in other colors.

The target value of EP is set for each color. If the difference in wavelength between two light rays is great, the difference is recognized as different colors by human eyes, and speckle noise is separated and recognized. In this case, the effect of spatial superposition is not obtained.

With the projector 1 of the first embodiment, it is possible to reduce speckle noise by adjusting the illumination distribution of the exit pupil image of the projection optical system 5 and to provide a projector capable of reliably reducing speckle noise.

Second Embodiment

Hereinafter, a second embodiment of the invention will be described referring to FIGS. 11 and 12.

The basic configuration of a projector of the second embodiment is the same as the first embodiment, and the configuration of a light source device is different.

Figure 11:
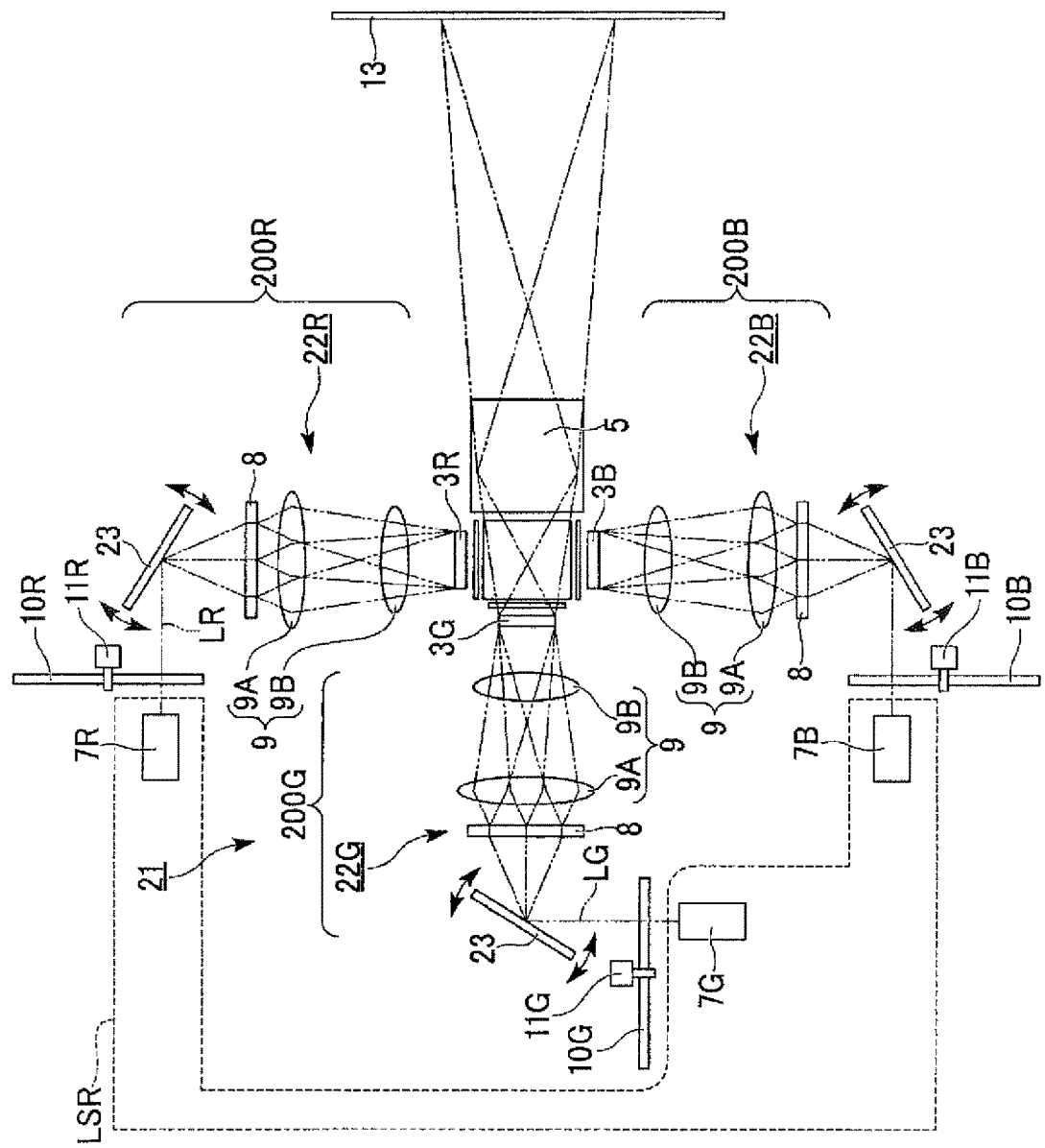
FIG. 11 is a schematic configuration diagram showing a projector according to a second embodiment of the invention.

FIG. 11 is a schematic configuration diagram showing a projector according to the second embodiment of the invention.

In FIG. 11, the constituent elements common to FIG. 1 used in the first embodiment are represented by the same reference numerals, and detailed description thereof will not be repeated.

As shown in FIG. 11, a projector 21 includes a laser light source device LSR, an illumination optical system 200R, an illumination optical system 200G, an illumination optical system 200B, a red liquid crystal light valve 3R, a green liquid crystal light valve 3G, a blue liquid crystal light valve 3B, a color composition element 4, and a projection optical system 5.

The illumination optical system 200R includes an optical path conversion element 23, a diffraction optical element 8, a superposition optical system 9, a first light diffusion element 10R, and a first drive device 11R.

The illumination optical system 200G includes an optical path conversion element 23, a diffraction optical element 8, a superposition optical system 9, a second light diffusion element 10G, and a second drive device 11G.

The illumination optical system 200B includes an optical path conversion element 23, a diffraction optical element 8, a superposition optical system 9, a third light diffusion element 10B, and a third drive device 11B.

A plurality of red laser light sources 7R and the illumination optical system 200R corresponding to a plurality of red laser light sources 7R constitute a red light source device 22R. A plurality of green laser light sources 7G and the illumination optical system 200G corresponding to a plurality of green laser light sources 7G constitute a green light source device 22G. A plurality of blue laser light sources 7B and the illumination optical system 200B corresponding to a plurality of blue laser light sources 7B constitute a blue light source device 22B.

The red light source device 22R includes a plurality of red laser light sources 7R. In FIG. 11, although only one red laser light source 7R is shown, a plurality of red laser light sources 7R are arranged in a direction perpendicular to the paper surface. In this embodiment, although six red laser light sources 7R are used, the number of red laser light sources is not particularly limited to six. The same applies to the green light source device 22G and the blue light source device 22B.

The optical path conversion element 23 is disposed on the optical path of the red laser light $L_R$ emitted from a plurality of red laser light sources 7R. In this embodiment, a galvano-mirror is used as the optical path conversion element 23. The galvano-mirror is a mirror which rotates around a rotation shaft. The optical path conversion element 23 is provided with a drive device (not shown). The optical path conversion element 23 is rotated within a given angle range by the drive device. According to the rotation of the optical path conversion element 23, the incidence angle of the red laser light $L_R$ from the red laser light sources 7R to the optical path conversion element 23 changes, and the emission direction of the red laser light $L_R$ from the optical path conversion element 23 changes.

Figures 12A, 12B:
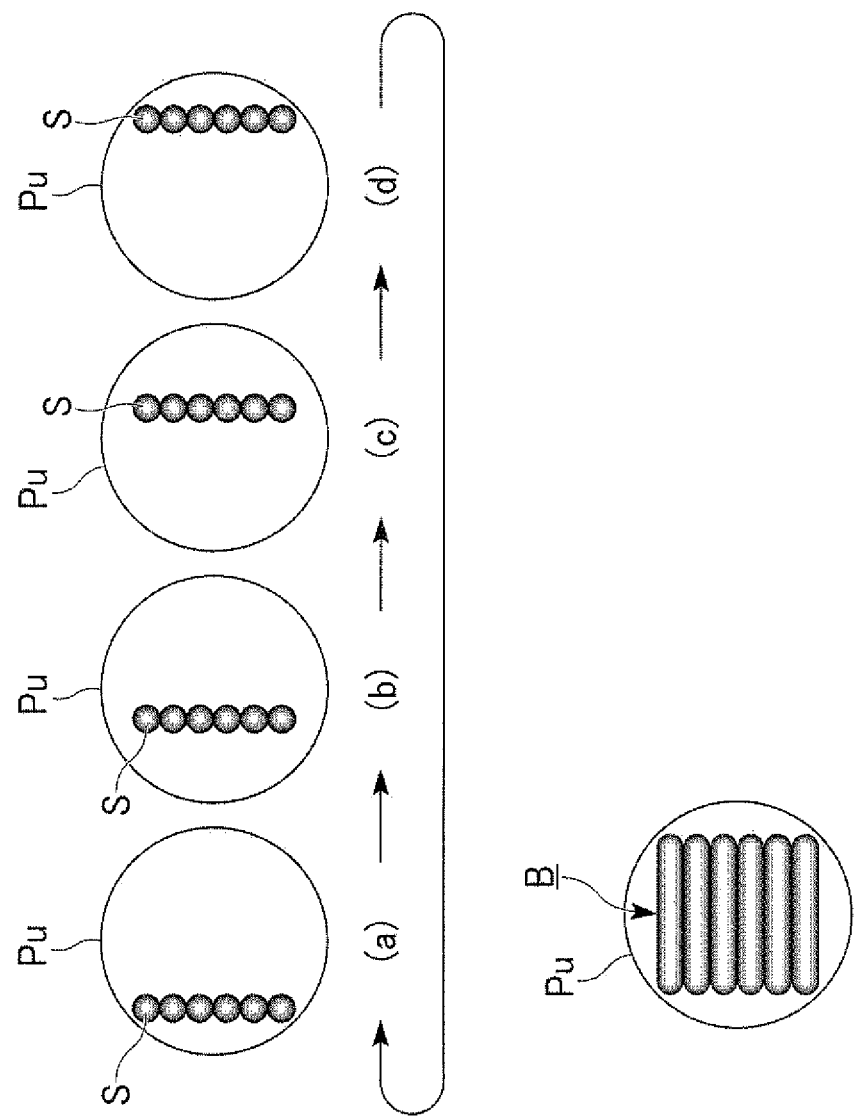
FIG. 12(A) is a diagram showing a temporal change of an illumination distribution.
FIG. 12(B) is a diagram showing a state where a temporal change of an illumination distribution is temporally integrated.

At this time, as shown in FIG. 12(A), six irradiation spots S corresponding to the arrangement of the red laser light sources 7R are scanned with time from one end toward the other end of an exit pupil Pu. In this way, the exit pupil image changes with time. Accordingly, in this embodiment, illumination is integrated over the time to be recognizable as one frame period by the human, for example, over 1/50 seconds. FIG. 12(B) shows an image of an illumination distribution B after illumination is integrated. EP is calculated in the same manner as in Example 1 with the illumination distribution B as the exit pupil image. The period to be recognizable as one frame period by the human corresponds to a unit time in the appended claims.

With the projector 21 of the second embodiment, it is possible to reduce speckle noise by adjusting the illumination distribution of the exit pupil image of the projection optical system 5 and to provide a projector capable of reliably reducing speckle noise. Furthermore, a value integrated over a unit time is used as the normalized illumination P(x,y), whereby it is possible to obtain an evaluation result with high accuracy even when the illumination distribution in the exit pupil image of the projection optical system 5 changes with time.

The technical scope of the invention is not limited to the foregoing embodiments, and various alterations can be made without departing from the spirit of the invention.

For example, in the foregoing embodiments, although a configuration in which the light diffusion element 10 is rotated is used in order to superpose speckle noise with time, a configuration in which the light diffusion element 10 is vibrated, the light diffusion element 10 is oscillated, or the like may be used.

The diffraction optical element 8 may be moved, instead of moving the light diffusion element 10. In this case, the light diffusion element 10 may be omitted. When the light diffusion element 10 is omitted, the light diffusion device is constituted of the diffraction optical element 8, and a drive device which moves the diffraction optical element 8.

Furthermore, means for superposing speckle noise with time is not limited to the above-described means.

In the foregoing embodiments, although the light diffusion device is provided even when speckle noise is not superposed with time, the light diffusion device may be omitted. However, in order to uniformize the intensity distribution of the exit pupil image, it is preferable to spread light using a light diffusion element or a lens.

In the foregoing embodiments, although the light diffusion element and the drive device are provided in each of the red laser light source 7R, the green laser light source 7G, and the blue laser light source 7B, the invention is not limited thereto. A set of a light diffusion element and a drive device common to the red laser light source 7R, the green laser light source 7G, and the blue laser light source 7B may be provided.

In the foregoing embodiments, although the light modulation device includes the red liquid crystal light valve 3R, the green liquid crystal light valve 3G, and the blue liquid crystal light valve 3B, the invention is not limited thereto. A configuration may be made in which one liquid crystal light valve modulates red light, green light, and blue light. Instead of the liquid crystal light valve, a digital micromirror device may be used.

In the foregoing embodiments, although the laser light sources are used in all of the light source devices for the respective color light components of R, G, and B, the laser light sources may be used in the light source devices of some color light components. For example, the invention can be applied to a projector including a light source device which generates other color light components using a monochrome laser light source and a wavelength conversion element. In addition, the number, arrangement, and the like of various constituent elements of the projector can be appropriately changed.

The entire disclosure of Japanese Patent Application No. 2013-197351, filed on Sep. 24, 2013 is expressly incorporated by reference herein.

What is claimed is:

1. A projector comprising:
a laser light source device;
a light diffusion device;
a light modulation device; and
a projection optical system,
wherein the laser light source device includes a first laser light source which emits red laser light,
the light diffusion device includes a first light diffusion element which is provided on the optical path of the red laser light, and a first drive device which moves a position where the red laser light is incident on the first light diffusion element,
the light modulation device includes a first light modulation element which is provided on the optical path of light emitted from the first light diffusion element,
light emitted from the first light modulation element is incident on the projection optical system, and
when the center coordinates of an illumination distribution of the red laser light in an exit pupil of the projection optical system are x=0 and y=0, normalized illumination at each coordinate is P(x,y) expressed by Expression (3), and a calculation range of integration is r (mm), EP determined from Expression (1) is EP≥35 mm$^3$, $$EP=\int_{-r}^{r}\int_{-r}^{r}\sqrt{x^2+y^2}P(x,y)dxdy \qquad (1)$$

$P(x,y)$=illumination (cd/m$^2$)/average illumination (cd/m$^2$) of the top 0.1% in an illumination distribution of a pupil diameter (3).

2. The projector according to claim 1,
wherein EP determined based on the illumination distribution of the red laser light is EP≥51 mm$^3$.

3. The projector according to claim 1,
wherein the laser light source device includes a second laser light source which emits green laser light,
the light diffusion device includes a second light diffusion element which is provided on the optical path of the green laser light, and a second drive device which moves a position where the green laser light is incident on the second light diffusion element,
the light modulation device includes a second light modulation element which is provided on the optical path of light emitted from the second light diffusion element,
light emitted from the second light modulation element is incident on the projection optical system, and
when the center coordinates of an illumination distribution of the green laser light in the exit pupil of the projection optical system are x=0 and y=0, normalized illumination at each coordinate is P(x,y), and a calculation range of integration is r (mm), EP determined from Expression (1) is EP≥27 mm$^3$.

4. The projector according to claim 1,
wherein the laser light source device includes a third laser light source which emits blue laser light,
the light diffusion device includes a third light diffusion element which is provided on the optical path of the blue laser light, and a third drive device which moves a position where the blue laser light is incident on the third light diffusion element,
the light modulation device includes a third light modulation element which is provided on the optical path of light emitted from the third light diffusion element,
light emitted from the third light modulation element is incident on the projection optical system, and
when the center coordinates of an illumination distribution of the blue laser light in the exit pupil of the projection optical system are x=0 and y=0, normalized illumination at each coordinate is P(x,y), and a calculation range of integration is r (mm), EP determined from Expression (1) is EP≥16 mm$^3$.

5. The projector according to claim 1,
wherein the laser light source device is a multimode semiconductor laser light source.

6. A projector comprising:
a laser light source which emits green laser light;
a light diffusion element which is provided on the optical path of the green laser light;
a drive device which moves a position where the green laser light is incident on the light diffusion element;
a light modulation element which is provided on the optical path of light emitted from the light diffusion element; and
a projection optical system on which light emitted from the light modulation element is incident,
wherein, when the center coordinates of an illumination distribution of the green laser light in an exit pupil of the projection optical system are x=0 and y=0, normalized illumination at each coordinate is P(x,y) expressed by Expression (3), and a calculation range of integration is r (mm), EP determined from Expression (1) is EP≥27 mm³, $$EP = \int_{-r}^{r}\int_{-r}^{r} \sqrt{x^2+y^2}\, P(x,y)\, dx\, dy \qquad (1)$$

P(x,y)=illumination (cd/m²)/average illumination (cd/m²) of the top 0.1% in the illumination distribution of the exit pupil image (3).

7. The projector according to claim 6, wherein EP≥38 mm³.

8. The projector according to claim 6, wherein the laser light source device is a multimode semiconductor laser light source.

9. A projector comprising:
a laser light source which emits blue laser light;
a light diffusion element which is provided on the optical path of the blue laser light;
a drive device which moves a position where the blue laser light is incident on the light diffusion element;
a light modulation element which is provided on the optical path of light emitted from the light diffusion element; and
a projection optical system on which light emitted from the light modulation element is incident,
wherein, when the center coordinates of an illumination distribution of the blue laser light in an exit pupil of the projection optical system are x=0 and y=0, normalized illumination at each coordinate is P(x,y) expressed by Expression (3), and a calculation range of integration is r (mm), EP determined from Expression (1) is EP≥16 mm³, $$EP = \int_{-r}^{r}\int_{-r}^{r} \sqrt{x^2+y^2}\, P(x,y)\, dx\, dy \qquad (1)$$

P(x,y)=illumination (cd/m²)/average illumination (cd/m²) of the top 0.1% in the illumination distribution of the exit pupil image (3).

10. The projector according to claim 9, wherein EP≥26 mm³.

11. The projector according to claim 9, wherein the laser light source device is a multimode semiconductor laser light source.

12. A projector comprising:
a laser light source device including a first laser light source which emits red laser light;
a light modulation device including a first light modulation element which is provided on the optical path of the red laser light; and
a projection optical system on which light emitted from the first light modulation element is incident,
wherein, when the center coordinates of an illumination distribution of the red laser light in an exit pupil of the projection optical system are x=0 and y=0, normalized illumination at each coordinate is P(x,y) expressed by Expression (3), and a calculation range of integration is r (mm), EP determined from Expression (1) is EP≥79 mm³, $$EP = \int_{-r}^{r}\int_{-r}^{r} \sqrt{x^2+y^2}\, P(x,y)\, dx\, dy \qquad (1)$$

P(x,y)=illumination (cd/m²)/average illumination (cd/m²) of the top 0.1% in the illumination distribution of the exit pupil image (3).

13. The projector according to claim 12, wherein EP determined based on the illumination distribution of the red laser light is EP≥119 mm³.

14. The projector according to claim 12, wherein the laser light source device further includes a second laser light source which emits green laser light,
the light modulation device further includes a second light modulation element which is provided on the optical path of the green laser light,
light emitted from the second light modulation element is incident on the projection optical system, and
when the center coordinates of an illumination distribution of the green laser light in the exit pupil of the projection optical system are x=0 and y=0, normalized illumination at each coordinate is P(x,y), and a calculation range of integration is r (mm), EP determined from Expression (1) is EP≥65 mm³.

15. The projector according to claim 12, wherein the laser light source device further includes a third laser light source which emits blue laser light,
the light modulation device further includes a third light modulation element which is provided on the optical path of the blue laser light,
light emitted from the third light modulation element is incident on the projection optical system, and
when the center coordinates of an illumination distribution of the blue laser light in the exit pupil of the projection optical system are x=0 and y=0, normalized illumination at each coordinate is P(x,y), and a calculation range of integration is r (mm), EP determined from Expression (1) is EP≥45 mm³.

16. The projector according to claim 12, wherein the laser light source device is a multimode semiconductor laser light source.

17. A projector comprising:
a laser light source which emits green laser light;
a light modulation element which is provided on the optical path of the green laser light; and
a projection optical system on which light emitted from the light modulation element is incident,
wherein, when the center coordinates of an illumination distribution of the green laser light in an exit pupil of the projection optical system are x=0 and y=0, normalized illumination at each coordinate is P(x,y) expressed by Expression (3), and a calculation range of integration is r (mm), EP determined from Expression (1) is EP≥65 mm³, $$EP = \int_{-r}^{r}\int_{-r}^{r} \sqrt{x^2+y^2}\, P(x,y)\, dx\, dy \qquad (1)$$

P(x,y)=illumination (cd/m²)/average illumination (cd/m²) of the top 0.1% in the illumination distribution of the exit pupil image (3).

18. The projector according to claim 17, wherein EP≥93 mm³.

19. The projector according to claim 17, wherein the laser light source device is a multimode semiconductor laser light source.

20. A projector comprising:
a laser light source which emits blue laser light;
a light modulation element which is provided on the optical path of the blue laser light; and
a projection optical system on which light emitted from the light modulation element is incident,
wherein, when the center coordinates of an illumination distribution of the blue laser light in an exit pupil of the projection optical system are x=0 and y=0, normalized illumination at each coordinate is P(x,y) expressed by Expression (3), and a calculation range of integration is r (mm), EP determined from Expression (1) is EP≥45 mm$^3$, $$EP = \int_{-r}^{r} \int_{-r}^{r} \sqrt{x^2+y^2} P(x,y) dx dy \quad (1)$$

$P(x,y)$ = illumination (cd/m$^2$)/average illumination (cd/m$^2$) of the top 0.1% in the illumination distribution of the exit pupil image   (3).

21. The projector according to claim 20, wherein EP≥59 mm$^3$.

22. The projector according to claim 20, wherein the laser light source device is a multimode semiconductor laser light source.

* * * * *